United States Patent [19]

Lobregt

[11] Patent Number: 5,559,901
[45] Date of Patent: Sep. 24, 1996

[54] METHOD AND DEVICE FOR DETERMINING A CONTOUR IN A SPACE OF IMAGE PARAMETER VALUES

[75] Inventor: Steven Lobregt, Eindhoven, Netherlands

[73] Assignee: U.S. Philips Corporation, New York, N.Y.

[21] Appl. No.: 268,080

[22] Filed: Jun. 28, 1994

[30] Foreign Application Priority Data

Jun. 29, 1993 [EP] European Pat. Off. .............. 93201882

[51] Int. Cl.⁶ ................................ G06K 9/40; G06K 9/48
[52] U.S. Cl. ......................... 382/256; 382/199; 382/298; 382/197
[58] Field of Search ...................... 382/199, 256, 382/257, 258, 259, 266, 269, 197, 298

[56] References Cited

U.S. PATENT DOCUMENTS 4,791,581 12/1988 Ohba ........................................ 364/521
5,239,591 8/1993 Ranganath ................................. 382/6

OTHER PUBLICATIONS

"Geometrically Deformed Models: A Method for Extracting Closed Geometric Models From Volume Data" J. Miller et al, Computer Graphics, vol. 25, No. 4 Jul. 1991, pp. 217–226.

Primary Examiner—Jose L. Couso
Assistant Examiner—Matthew C. Bella
Attorney, Agent, or Firm—Jack D. Slobod

[57] ABSTRACT

In a space having image parameter values, a contour (10) is defined consisting of vertices (11, 12, 13) connected by edges (14, 15, 16). By variation of the position and number of the vertices as a function of the variation of image parameter values in the space, the contour (10) is determined to follow features in the density variation. The movement of vertices is restricted to a direction ($\hat{P}_i$) perpendicular to the local direction ($\hat{t}_i$) of the contour (10). For smoothing the contour (10), an internal force or energy is defined at each of the vertices (11, 12, 13) which force or energy depends on the angle ($c_i$) between the edges at the vertex, or of the variation of the angles along a sequence of adjacent vertices. A direct interaction between vertices is thereby avoided.

20 Claims, 3 Drawing Sheets

METHOD AND DEVICE FOR DETERMINING A CONTOUR IN A SPACE OF IMAGE PARAMETER VALUES

BACKGROUND OF THE INVENTION

1. Field of the Invention

The invention relates to a method for determining a contour in a space image parameter values, in which a plurality of initial vertices located on a seed contour are defined, said vertices being connected by edges to neighbouring vertices, an energy function having an internal portion which is a function of the curvature at each of the vertices and an external portion determined by the density variation at the location of each of said vertices evaluated, and a final contour is determined by varying the position of the vertices till the energy function reaches a minimum.

2. Description of the Related Art

Such a method can, for example, be used in a medical imaging environment for (semi-)automatically defining the outline of a region of interest or of an object, such as an organ or a tumour, in a 2 or 3 dimensional image. Images of clinical importance can be obtained by a variety of medical imaging modalities for example, a conventional X-ray technique, a CT-scanner, magnetic resonance imaging, single photon emission computerised tomography, positron emission tomography or by means of ultrasound echography. Other areas in which deformable contours can be used are, for example, computer graphics and animation. The defined outline of the object can, for example, be used as a basis for providing quantitative information to a physician, for surface extraction for visualisation or for volume definition.

These imaging technologies generate a discrete three-dimensional scalar volume field where each value is a measure of some physical property, for example density. One way of analyzing and displaying the raw scalar field is to generate a geometric model of the scanned object using the volume data as a measure of the object configuration. One approach is to create a "seed" model in the volume data set and then deform the model by a relaxation process that minimizes a set of constraints that are associated with each vertex in the model. The constraints control local deformation, interaction between the model and the data set, and the shape and topology of the model. By minimizing these constraints, one achieves an effect similar to inflating a balloon within a container or collapsing a piece of shrink wrap around an object.

Such a geometrically deformed model is created by specifying first the behavior and characteristics of the model being defined, then selecting constraints to achieve the desired behavior, and finally developing functions that model the constraints. Orthogonal behaviors must be specified. A first one is a mechanism for generating gross deformations. In the balloon analogy, this mechanism expands the balloon. A second mechanism is needed that will interact with the data set and identify voxels on the desired object boundary. This function restricts the balloon from expanding through the boundary of the object being modelled.

Each of these behaviors can be modelled by a term in a local cost function associated with each vertex in the model. These cost functions are also referred to as potential functions. In the following detailed description such potential functions are also collectively referred to as an energy function. The first mechanism is hereinafter referred to as the internal portion of this energy function and the second mechanism is hereinafter referred to as the external portion of this energy function.

The term energy function is not related to physical energy, but is used because the procedure of contour definition has some resemblance to a string of interconnected masses moving in a field of varying potential energy and trying to establish a stable situation of minimum energy. In this similarity the external portion of the energy function corresponds to the density or potential energy and the internal portion to the mutual interaction of the elements of the string.

Such a method for defining is known from an article by J. V. Miller et al., entitled "Geometrically deformed models: A method for extracting closed geometric models from volume dam", published in Computer Graphics, Vol. 25, No. 4, (1991), pages 217–226. In that article a contour is described as a set of vertices connected by edges. The energy function comprises a topology preserving energy term, dependent on an estimation of local curvature and the distance between a vertex and its neighbours, an image event energy term, derived from the density (or pixel values), and a locally defined deformation potential driving the vertices outward or inward. The energy function is evaluated for the vertex positions, not for the trajectory of the connecting edges. This makes the contour discrete, whereby the resolution is determined by the length of the edges. Processing of a seed contour, entered by an operator as a number of vertex points, to a final contour occurs in an iterative procedure. During each step the vertices are moved in the direction of steepest descent along the surface provided by the energy function. Movement of a vertex stops when no energy reduction occurs.

In the known method, the value of the energy function can decrease if a vertex is displaced along an edge and, therefore, the different vertices tend to cluster in corners of the contour. Another disadvantage is that the contour may collapse or expand within a region in which no density variation is present. To avoid such behaviour the known method needs the topology preserving term in the energy function. This topology maintaining term provides constraints or interactions between vertices which are artificial and not related to the density variation in the space. Accordingly, deviations between the contour obtained and the actual shape of the object may occur due to these constraints.

SUMMARY OF THE INVENTION

It is, inter alia, an object of the invention to provide a method for defining a contour in which method there is no interaction between vertices.

To this end, the method according to the invention is characterised in that of the image parameter values for each of the vertices the internal portion of the energy function is dependent on the angle between the edges at the respective vertex and in that the external portion of the energy function is related to the variation of the image parameter values in a direction having equal angles with each of the edges at the respective vertex. The energy contribution of each vertex to the contour as a whole does not depend on the distance to the neighbouring vertices and there is no direct interaction between the vertices. As the energy variation at a vertex depends only on the direction "perpendicular" to the local path of the contour, during each iteration vertices will move only in this perpendicular direction and clustering of vertices will be avoided.

The method according to the invention can be further characterised in that the internal energy portion is derived from the difference in angles of the edges at a series of adjacent vertices. In order to avoid shrinking purely due to the internal portion of the energy function, the internal portion is made dependent on the shape of the contour. In this embodiment the internal portion will only contribute if the "curvature" of the contour, i.e. the numerical value of the angle between edges at adjacent vertices, changes. When the internal portion of the energy function contributes in this way, in a region with no variation in the image parameter values, a circular portion of the contour will not shrink, while a zigzag portion of the contour will straighten. Both kinds of behaviour represent a desired feature of the contour.

An embodiment of this method is characterised in that said internal energy portion is obtained by the convolution of said difference in angles with a symmetric discrete filter having a zero frequency component equal to zero. Such a filter imposes the desired behaviour. In a two-dimensional contour the most simple form of such filter is $(-\frac{1}{2}, 1, -\frac{1}{2})$, i.e. the internal portion at a vertex is proportional to the angle at the vertex itself minus the average of the angles at both adjacent vertices.

An embodiment of the method according to the invention is characterised in that the seed contour is open. In a two-dimensional situation this corresponds to a curve in the space having two ends. Such an end has only one edge and no energy contribution from a term that corresponds to the angle of two edges. In case of a three-dimensional contour it means that a face between a number of vertices is, at least at one side, not joined by another face. In both cases vertices can move away from the contour, thereby extending the contour and eventually closing it.

A preferred embodiment of the method according to the invention is characterised in that if during minimization of the energy function an edge length exceeds a first predetermined threshold, the edge is replaced by an additional vertex and connecting edges. Although, in the present method, the movement of a vertex along an edge will not change the energy contribution, vertices may move away from each other due to energy contribution of the density variation. Too long edges reduce the resolution of the contour. To maintain the resolution at regular intervals, vertices are added in long edges.

The opposite may also occur, if edges become too short a computational load in performing the method is present without any benefit in resolution. In that case the short edge is taken out.

An embodiment of the method is characterised in that a user defined energy distribution is added to the external portion of the energy function. Such a user function forces the contour to respect user defined restrictions, for example to keep out of areas in the space where the user knows no interesting features are present.

If contours have to be determined in a number of similar images, for example images representing adjacent slices in a body obtained by CT or MRI, it is possible to use the results in one slice as a starting point in the next. Such an embodiment of the method is characterised in that firstly a contour is determined in a first space and that, secondly, a contour is determined in a second space having a density variation having similar features to the density variation in the first space whereby the seed contour in the second space is defined by transfer of the final contour obtained in the first space.

The invention also relates to an arrangement for determining a contour a space in a space of image parameter values which vary throughout said space, the arrangement comprising a memory for storing image parameter values in said space in the form of a matrix of pixel values;

a display having a two-dimensional matrix of pixels;

pointer means for indicating initial vertex positions for the definition of a seed contour;

computing means, having access to said memory and said vertex positions, for evaluating an energy function comprising an internal portion which is a function of the curvature at each of the vertices and an external portion determined by the variation of image parameter values at the location of each of said vertices; the computing means being arranged for determining a final contour by continuously varying the position of the vertices till the energy function reaches a minimum, while for each of the vertices the internal portion of the energy function is dependent on the angle between the edges at the respective vertex and in that the external portion of the energy function is related to the variation of image parameter values in a direction having equal angles with each of the edges at the respective vertex.

Such an arrangement or workstation is used to perform the method according to the invention.

These, and other more detailed aspects of the invention will now be elucidated by way of example with reference to the accompanying drawings.

DETAILED DESCRIPTION OF THE PREFERRED EMBODIMENTS

For reasons of convenience, in the following description the effects of the minimisation of the energy function are described in the term of forces acting on the vertices. In the similarity between a string of particles or masses moving in a potential energy field the two approaches are equivalent in that a particle in an energy field can be thought of as being subject to a force that is related to the gradient of the energy: $F=-\nabla E$. The two ways of description are completely equivalent. A description in terms of forces however, seems to be more convenient for the present method, because the forces relate directly to the acceleration and displacement of the vertices of the contour.

In the description the method is illustrated by a two-dimensional version. Extension to three-dimensional spaces is straightforward, in as much as the structure will be edge-connected vertices and evaluation will be performed locally on vertex positions.

Starting from an initial shape, which can be created with a minimum of user interaction, the dynamic contour actively modifies its shape, thus approximating some desired contour. The driving force behind the shape deformation is calculated from internal forces, derived from the shape of the contour itself, and an external force field, derived from some image feature energy distribution. The internal forces will try to minimize local contour curvature, while the external forces will try to make the contour follow a valley or a ridge through the 'landscape' formed by the image feature or density variation. By applying both internal and external forces with user definable weight factors, the user can determine to either follow the image feature landscape in a very global way, or very precisely, or anything in-between.

The deformation process is performed in a number of discrete steps, after each of which the situation with regard to position, velocity and acceleration is evaluated for each of the vertices. In this evaluation internal and external forces on a vertex are calculated from the position of the vertex and its neighbours. These forces result in an acceleration, which changes the velocity of the vertex. This velocity determines the displacement of the vertex during the next deformation step. After a number of deformation steps a stable end situation will be reached in which there is an equilibrium, which means that velocity and acceleration are zero for each vertex. Described in terms of energies, this situation represents a local minimum of the energy function.

During deformation there are two undesirable effects which may occur: shrinking of closed contours owing to internal forces, and clustering or gathering of vertices in corners of the contour, owing to external forces. In the present invention the shrinking problem is overcome by a proper definition of local curvature at the vertices, combined with a definition of internal forces which is derived from local curvature in such a way, that these forces are not only zero for parts of the contour where curvature is zero, but also for parts where the curvature is constant. The solution to the second problem is found by allowing only locally radial vertex displacements.

Figure 1:
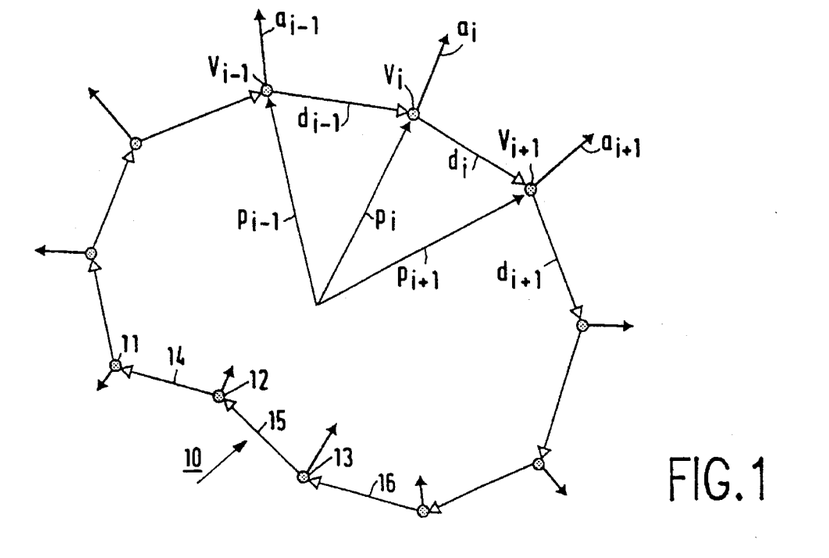
FIG. 1 the basic structure of contour and its elements as used in the method according to the present invention.

FIG. 1 presents the basic structure of the contour 10 as used in the invented method. The contour is an object consisting of vertices 11, 12, 13, . . . which are connected by straight line segments or edges 14, 15, 16, . . . The position of a vertex $V_i$ is represented by a vector $p_i$ and the edge between $V_i$ and $V_{i+1}$ by a vector $d_i$, the coordinate system is assumed to be Cartesian. Deformation is caused by a combination of forces which act on the vertices; the resulting acceleration in vertex $V_i$ is denoted by a vector $a_i$. Another property of a vertex, not shown in the Figure, but important for the dynamic behaviour of the contour, is its velocity, denoted by $v_i$ for vertex $V_i$.

As mentioned before, the length $\|d_i\|$ or segment represents the local resolution of the contour: if it is large the contour will not be able to follow variations of small scale in the image feature energy distribution. The length $\|d_i\|$ may change during every deformation step, thus causing local variation in the resolution of the contour. To keep this variation limited, the edge lengths are evaluated at regular intervals; where necessary, vertices are removed or inserted, thus keeping the resolution of the contour close to a user-specified scale.

Figure 2:
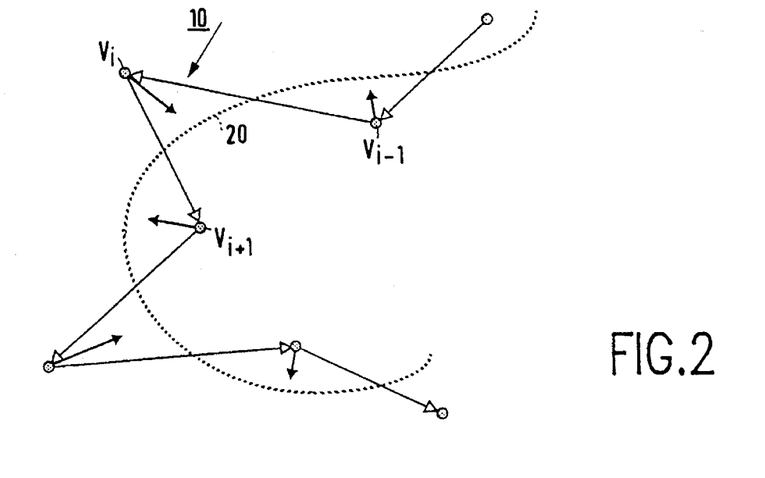
FIG. 2 an illustration of the internal forces and their effect on the contour.

The energy function comprises an internal portion or, in other words, the vertices are subject to internal forces. The internal forces defined in the present method are related to the local curvature of the contour. The main objective of introducing internal forces or energy functions is illustrated in FIG. 2: minimizing local curvature, forming a counter-balance to external forces that try to shape the contour according to all the variations of the image feature landscape, in order to obtain a good approximation of a smooth curve 20.

Firstly, the concept of local curvature in a discrete contour is to be defined, which is not a trivial matter. Strictly speaking, local curvature is zero on the straight edge segments in-between the vertices, while it is not defined at the exact position of a vertex (first order discontinuity), which however happens to be exactly the position where it needs to be defined. A satisfactory solution is defining local curvature at the position of a vertex to be the difference between the directions of the two edge segments that join at that location. The edge segment leaving from vertex $V_i$ is represented by a vector $d_i$; its direction is described by the unit vector $\hat{d}_i$. According to the definition above, the local curvature $c_i$ at $V_i$ is described by (see FIG. 3): $c_i = \hat{d}_i - \hat{d}_{i-1}$. Defined in this way, local curvature has length (strength) as well as direction and provides a usable and unique measure for the angle between two joining edge segments. Moreover, the length of the curvature vector depends only on this angle, and is not influenced by the lengths of the two joining edge segments.

Figure 4:
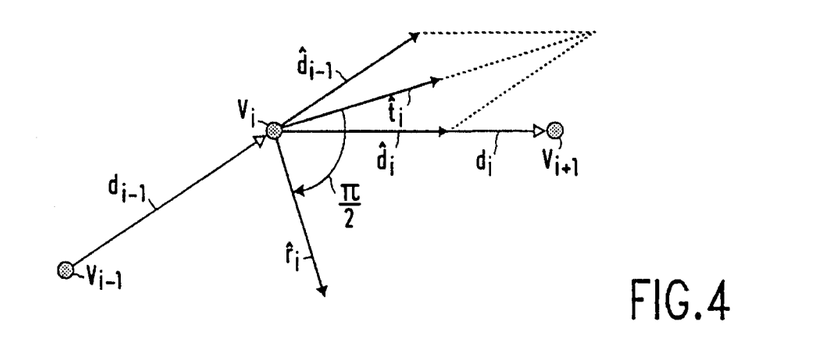
FIG. 4 an illustration of the radial and tangential directions in a vertex of a contour.

Also locally radial and tangential directions at the position of a vertex are defined. For this use is made of the unit vectors $\hat{d}_i$ representing the directions of the edge segments $d_i$. In the present method the locally tangential unit vector $\hat{t}_i$ is defined as the normalized sum of the unit vectors of two joining edge segments (see FIG. 4): $\hat{t}_i = \hat{d}_i - \hat{d}_{i-1}/\|, \hat{d}_i + \hat{d}_{i-1}\|$. The unit vector $\hat{r}_i$ in the local radial direction is derived from $\hat{t}_i$ by a rotation over $\pi/2$ radians. The vectors $\hat{t}_i$ and $\hat{r}_i$ now represent a local coordinate system at the position of vertex $V_i$, which is useful for the calculation of internal as well as external forces.

Both closed and open contours are allowed. If the number of vertices equals n and the contour is closed, the first and the last vertices are connected, so $V_0$ has two neighbours: $V_{n-1}$ and $V_1$. If, however, the contour is open, $V_0$ and $V_{n-1}$ are not connected and have both but one neighbour: $V_0$ only connects to $V_1$ and $V_{n-1}$ only connects to $V_{n-2}$. This situation requires special measures for the calculation of the local tangential and radial directions $\hat{t}_i$ and $\hat{r}_i$ as well as the curvature vector $c_i$. At the position of the open ends the local tangential direction is taken to be equal to the direction of the first c.q. the last contour segment. The length of the curvature vector is set to zero for both end positions.

The local curvature vector $c_i$, when described in terms of the local r,t-coordinate system is always directed along the local r-axis, pointing either in exactly the direction of $\hat{r}_i$, or in the opposite direction. In other words, $c_i$ is a vector along the local r-axis and its length can be described by the dot product $(c_i \cdot \hat{r}_i)$. According to this definition, the length $\|c_i\|$ of the curvature vector can be positive as well as negative: $C_i = (c_i \cdot \hat{r}_i)\hat{r}_i$.

Local curvature is defined now as a one-dimensional variable in locally radial direction. The internal forces which should act on the vertices of the contour are to be defined and restrictions put on the deformation process. In order to get a clear understanding of the contribution that internal forces will make to the deformation of the contour, a situation is considered in which external forces are completely absent.

Figure 3:
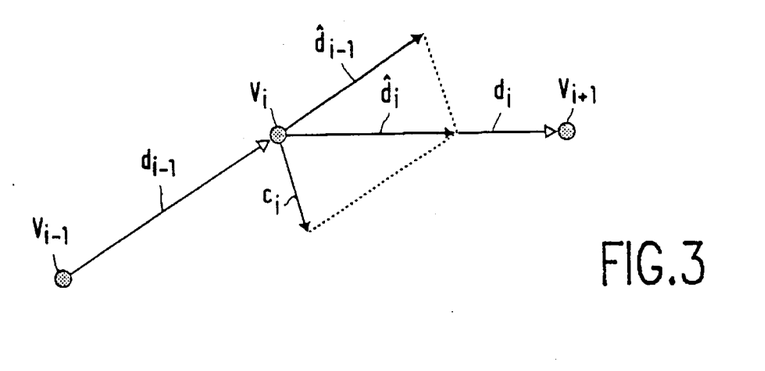
FIG. 3 an illustration of the definition of local curvature at a vertex in the method according to the invention.
Figure 5A:
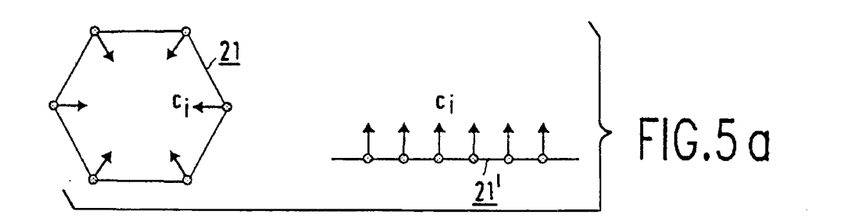
FIGS. 5a, 5b and 5c, the effects of uncompensated internal forces in typical contour shapes and in absence of external forces.

As can be seen from the FIGS. 2 and 3, the desired internal forces (FIG. 2) and the curvature vectors (FIG. 3) are very closely related; both are vectors in locally radial direction with the same orientation. It would however not be wise to define the internal forces as being proportional to the local curvature vectors. The reason for this is illustrated in the left part of FIGS. 5a, 5b and 5c. Any simple closed shape, such as shown in FIG. 5a in Cartesian representation, would in the absence of external forces be deformed into the shape 21 having the minimum overall local curvature, i.e. a circle (or rather, because of the discretisation, a symmetric polygon). Then however, the deformation process would not stop, but continue to move the vertices in the direction of the centre of the contour. During this last phase the contour is shrinking while local curvature will not change, which means that the internal forces are not doing what they were intended to do: reduce local curvature. The contour will completely implore into a single point.

By introducing a second constraint on the position of a vertex with respect to its neighbours, the shrinking process can be brought to a halt. This second constraint acts like an elastic force that keeps the distance between neighbouring vertices between certain limits. Vertices which are moving closer together will experience an increasingly repelling force that at some point will stop the shrinking process. The point where the shrinking process comes to a stop depends on the weights that are assigned to the two internal constraint forces. In other words: it is required to optimize the balance between the internal elastic force and the internal curvature minimizing force.

In order to avoid the introduction of the second - rather artificial constraint and the problems entailed by it, in the method according to the present invention it is required that local curvature should be reduced without affecting parts of the contour with constant curvature.

Figure 5B:
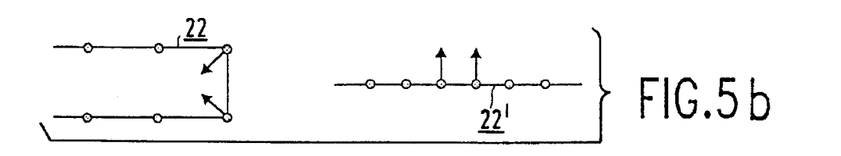
Figure 5C:
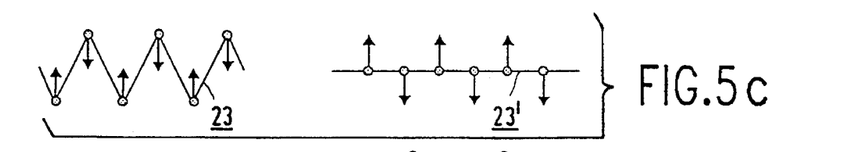

FIGS. 5a, 5b and 5c illustrate on the left in Cartesian representations. besides the already discussed symmetric polygon 21 in FIG. 5a, some typical shapes which may occur in a discrete contour. FIG. 5b shows a portion 22 of a contour having a turn in direction over $\pi$ radians and FIG. 5c a portion 23 of a contour with alternating curvature direction. This further illustrates the inadequacy of using an internal force proportional to the curvature vector.

The shape 22 in FIG. 5b also shows a problem. It forms an extended part of a contour. If a force proportional to local curvature would be applied to the vertices, the extended part would become shorter as shown in the Figure. However, as with the shrinking of the shape in FIG. 5a, this would not actually reduce local curvature, but only displace the curved region.

The shape 23 shown in FIG. 5c does not pose a problem; it is included because it represents a typical situation in which local curvature reduction may be required. Any solution to the shrinking problem should still perform well on this shape.

On the right side of FIGS. 5a, 5b and 5c the same three shapes are shown, but now in local r,t-coordinates, labelled 21', 22' and 23', respectively. Examination of the curvature vectors in this coordinate system, combined with the intention to derive from these vectors the internal forces that would meet the above stated criteria, provides a solution.

First: internal forces $f_{in,i}$ which act on the vertices $V_i$ should have the same (radial) direction as the curvature vectors. This means that internal forces can be derived from the curvature vectors by modifying only their lengths. Second: in order to reduce local curvature without affecting areas of constant curvature, the lengths of the internal force vectors should be zero for parts of the contour with constant curvature. Both conditions can be met if the sequence of dot products $(c_i \cdot \hat{r}_i)$ along the contour is considered as a discrete scalar function, and if the convolution of this function with a discrete filter $k_i$ is used as the representation of the sequence of internal force vector lengths $\|f_{in,i}\| = (c_i \cdot \hat{r}_i) \otimes k_i$.

The first condition can be met by using $\hat{r}_i$ as the direction of $f_{in,i}$: $f_{in,i} = \|f_{in,i}\| \cdot \hat{r}_i$. The second condition is met by choosing appropriate filter coefficients for $k_i$ in which a convolution of a sequence of constant values with $k_i$ will be zero. This is achieved by a filter $k_i$ which is a symmetric discrete filter with a zero frequency component equal to zero. A wide class of filters complies with this condition. In its simplest form it is a filter consisting of three coefficients with the values $k_i = (-\frac{1}{2}, 1, -\frac{1}{2})$. Other possible filters provide an interesting way to optimize the behaviour of the contour for specific applications. In particular, in may be advantageous to make $k_i$ adaptive.

Figure 6A:
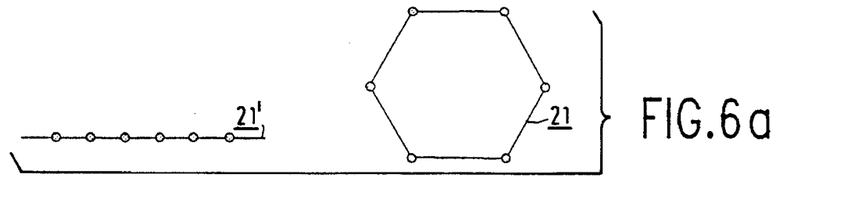
FIGS. 6a, 6b and 6c, the internal forces in typical contour when derived by means of a filter taking into account the variation from vertex to vertex.
Figure 6B:
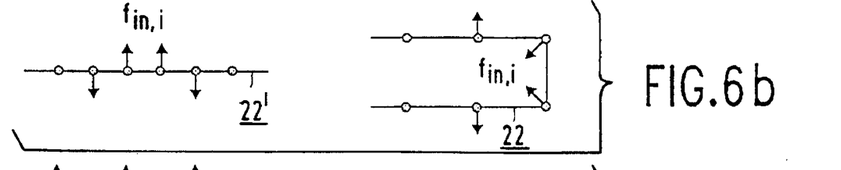
Figure 6C:
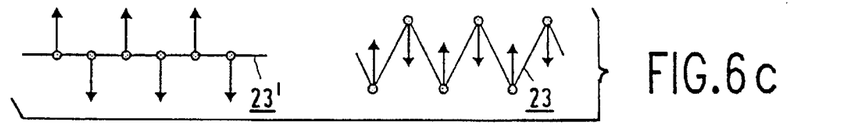

The results of this filter are illustrated in FIGS. 6a, 6b and 6c, which shows on the left side again the three typical shapes 21', 22' and 23' in local r,t-coordinates, but now with the internal force vectors which were derived from the curvature vectors. The right side of the Figure shows the shapes 21, 22 and 23 and internal forces in Cartesian coordinates. The constant curvature of shape 21 in FIG. 6a of the Figure resulted in internal forces that are zero everywhere, showing that the shrinking problem has been solved. The $\pi$ radians turn of the shape 22 of FIG. 6b is deformed in a way that appears more natural. Not only does the extended contour part become shorter, but it also becomes wider, which is what would be expected from curvature reduction. The alternating curvature 23, shown in FIG. 6c, will still be reduced effectively, as the effect of convolution with $k_i$ on a purely alternating signal comes down to multiplication with a constant. In consequence, the internal forces $f_{in,i}$, as defined hereinbefore, produced the desired deformation effects to the contour in the absence of any external forces.

To provide a driving force for the deformation of the contour, an external potential energy distribution is assumed, which represents the energy or strength of some kind of image feature or combination of image features. The selection of appropriate image features for specific applications is an important subject but not part of the invention. In the following the behaviour of the contour using simple image features like the pixel or voxel grayvalue itself and the length of the grayvalue gradient is demonstrated. If, for instance, a contour should follow a maximum gradient path through the image, the gradient length could be used as an image feature and an energy distribution defined that is high for large values of this feature. A maximum gradient path is then represented by a ridge in this energy distribution. The implementation of the deformation process is such that it will attempt to pull the vertices into local minima of the energy distribution, which is a natural behaviour. For the contour as a whole this means that it will end up following a path of low energy or a valley through the feature energy landscape. If the contour is to follow a ridge instead of a valley, as in this example, this can be done by inverting the energy distribution. The resulting distribution of potential energy is called Elm. The force field that will pull an object in the direction of lower energy, can be described by the following simple relation: $f_{im}=-\nabla E_{im}$.

If this force is applied to the vertices of a contour in a situation in which there are no internal forces, then the result will be that in the end the contour connects local energy minima, following a valley through the external energy distribution. However, in case of applying the above described force field, a problem is that the force $f_{im}$, which acts on the vertex $V_i$, will in general have a component along the path of the contour (locally tangential component). This tangential component may be substantial, or even dominant. If there were no restrictions on the curvature of the contour (e.g. in the absence of internal forces), then in the final situation the contour would actually pass through the local minima of the external energy distribution, in which case the force field would locally be directed along the path of the contour! The result of this locally tangential component is that vertices will move along the contour and form clusters in local minima of the external energy distribution, which is obviously a very undesirable effect.

Introducing an elastic force as a second internal force, in order to keep the distance between neighbouring vertices within limits, assuming that such a force could be an effective answer to the clustering problem. In this situation the strength of the elastic force would have to be tuned locally to the strength of the external force $f_{im,Vi}$ at the location of vertex $V_i$. This external force varies, not only over the area of the image matrix, but also from image to image and it depends on many parameters related to both data acquisition and processing of the acquired data, like for instance the feature extraction algorithm that was used. Careful tuning of the internal elastic force is important: If the elastic force is too weak it may lead to shrinking of the contour owing to internal curvature forces, or it may lead to clustering of the vertices owing to external forces. If the elastic force is too strong it may obstruct the deformation process of the contour, because during deformation the vertices must have the freedom to move and change the distance to their neighhours. It follows that correct tuning is very important, but in general not possible. The internal elastic force cannot be tuned locally to the external forces $f_{im,Vi}$ and at the same time be tuned correctly to the internal forces $f_{in,i}$.

Figure 7:
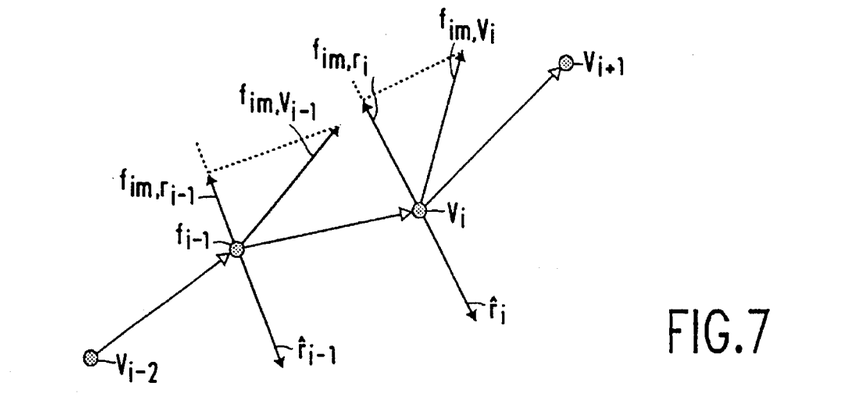
FIG. 7 the locally radial components $f_{im,ri}$ of the external forces $f_{im,vi}$ according to the invention that provide a resulting driving force on the vertices of the contour.

According to the present invention, this problem is solved in line with the solution to the shrinking problem, discussed hereinbefore. Vertex displacement along the path of the contour does not make any contribution to the deformation. Only the locally radial component of $f_{im,Vi}$ is used to drive the vertices of the contour. If the locally radial component $f_{im,Vi}$ is denoted by $f_{im,ri}$, then its length is given by the dot product of $f_{im,Vi}$ and $\hat{r}_i$: $f_{im,ri}=(f_{im,Vi}\cdot\hat{r}_i)\hat{r}_i$. This is illustrated in FIG. 7, which shows the locally radial forces $f_{im,ri}$ and $f_{in,i}$ that provide a resulting driving force on the vertices of the contour which is purely devoted to deformation of the contour, without moving vertices along the path of the contour.

For a user of dynamic contour modelling tools to have control over the contouring process is an important aspect. Normally, real world images lend themselves rarely for fully automatic contouring to give satisfactory quality. Some operator guidance may be desirable for object definition purposes. Also, the state of minimum energy reached by the contour may often be one out of a set of possible-local minima, and the operator should then have the possibility to push the contour out of a local minimum into another. Therefore, the present method, as described hereinbefore, may be supplemented with a possibility for the user to interactively create and modify a user defined external energy distribution $E_{user}$, to be added to the calculated image feature energy distribution $E_{im}$ to form a combined external energy distribution $E_{ex}$. The user defined distribution enables the operator to create additional ridges and valleys through the energy landscape to locally force the contour to follow a particular path. Once these two external energy distributions are combined, the situation is completely equivalent to the one above, and calculation of the resulting external force $f_{ex,ri}$, acting on a vertex $V_i$ of the contour becomes: $f_{ex,ri}=(f_{ex,Vi}\cdot\hat{r}_i)\hat{r}_i$, in which $f_{ex}=-\nabla(E_i+E_{user})$.

With these definitions of the internal and external forces used in the method the dynamics of the deformation process according to the method will be described.

The distance between a vertex and its neighhours determines the resolution of the contour, details of the external image feature energy distribution, which are small enough, may pass through the spaces between the vertices, without having a significant influence on the final shape of the contour. Because of the deformation of the contour, the vertex to vertex distance will change constantly. This may result in local variation as well as in global changes in the resolution of the contour. Both are undesirable, but slight local variation in the resolution is unavoidable, because a deformation process can only be possible if the vertices have the freedom to move with respect to their neighbours. For this reason, the variation is kept between certain limits, by periodically resampling the contour along its path. In local r,t-coordinates this translates into a resampling along the t-axis.

The total force $f_i$ acting on a vertex is a weighted combination of external and internal forces: $f_i=w_{ex}f_{ex,ri}+w_{in}f_{in,i}$. The weighting factors $w_{ex}$ and $w_{in}$ may have default values for each application but allow modification by the operator. Upon emphasizing on external forces one will make the contour follow the extracted image features more precisely, while putting emphasis on internal forces will smooth out the path of the contour. As a result of the forces that act on a vertex $V_i$, this vertex will start to move and change its position Pi. This position vector, together with the vertex velocity and acceleration vectors $v_i$ and $a_i$, describe the dynamic state of a vertex. A vertex will not stop moving until both $\|v_i\|=0$ and $\|a_i\|=0$. The deformation process of a contour is not completed before this condition $\|v_i\|=\|a_i\|=0$ is met by all its vertices. It may in principle take very long before the contour comes to a rest, or the contour may even remain oscillating between two states, which both represent a local energy minimum. To avoid such behaviour a third component is added to the force that is applied to a vertex $V_i$, viz. a damping force, proportional to the vertex velocity $v_i$: $f_i=w_{ex}f_{ex,ri}+w_{in}f_{in,i}+w_{damp}V_i$. The weighting factor $w_{damp}$ is negative and determines the amount of damping. Even a small damping factor suffices to ensure stability of the deformation process.

In an embodiment the actual deformation process is implemented as a so-called numerical time integration process, in which the complete state of the contour is calculated at a sequence of discrete positions in time. Let the argument t describe the state of the contour at a certain point t in time, and t+Δt the situation at a time Δt later, then the deformation process during the incremental time Δt can be described by the following difference scheme:

$$P_i(t+\Delta t)=P_i(t)+v_i(t)\Delta t;$$

$$v_i(t+\Delta t)=v_i(t)+a_i(t)\Delta t;$$

$$a_i(t+\Delta t)=f_i(t+\Delta t)/m_i.$$

The value of $f_i(t+\Delta t)$ is calculated as indicated hereinbefore. The value $m_i$ would, in a physical context, represent the 'mass' of vertex $V_i$. In a prototype implementation of the method no use is made of the possibility to assign different mass values to the vertices of the contour. By assuming the same mass for all vertices, $m_i$ reduces to a constant scaling factor. In the implementation the procedure was further simplified by giving the time interval $\Delta t$ a value of one.

An option which is available for open contours is a growing process that adds vertices to one or both of the open ends of the contour. By integrating this growing with the deformation of the contour an efficient tracking method is obtained. Vertices that are added are positioned by extrapolating in the direction of the last (or first) edge segment, which is at the same time continuously being repositioned by the deformation process. An automatic closing option can be added as well, such that both ends of an open contour are automatically connected when the distance between them becomes smaller than a certain threshold.

In a prototype that was implemented, the user can interactively control a parameter $\iota_{des}$, the desired length for the edge segments of the contour. In this way, the resolution of the contour can be chosen. A default value for $\iota_{des}$ can be calculated by normalizing $\iota_{des}$ by the inner scale of the image. This means that $\iota_{des}$ increases when the image is considered at a coarser scale. From $\iota_{des}$ two other values $\iota_{min}$ and $\iota_{max}$ are derived, representing the minimum and maximum distance which is allowed between neighbouring vertices.

Figure 8:
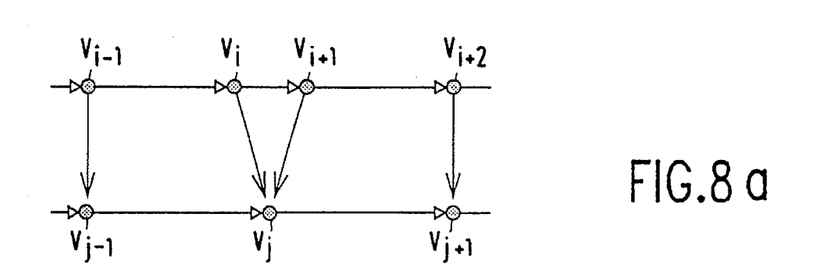
FIGS. 8a and 8b the replacement of two nearby vertices by a single vertex and the insertion of an additional vertex in between adjacent vertices that are far away from each other.

In the prototype, resampling is implemented as a two pass process: The first pass checks along the entire contour if any segment length has become shorter than the minimum length $\iota_{min}$. If such an edge segment is found, this edge segment is removed from the contour by replacing the two vertices on both ends of this segment by one single vertex at a position exactly in-between the replaced vertices. This is illustrated in FIG. 8a, showing two closely adjacent vertices $V_i$ and $V_{i+1}$ being replaced by a single vertex $V_j$. The second pass checks again along the entire contour, but now for segments with a length larger than the maximum length $\iota_{max}$. In this case such an edge segment is divided into two shorter ones of equal length, as illustrated in FIG. 8b. In this Figure a vertex $V_{j+1}$ is inserted halfway in between vertices $V_i$ and $V_{i+1}$, necessarily the latter vertex is to be relabelled to $V_{j+2}$. The values of $\iota_{min}$ and $\iota_{max}$ are derived from the length $\iota_{des}$. The relation between these parameters is constrained by not admitting an oscillatory behaviour, in which vertices are repeatedly removed in one resampling action and inserted again in the next. This leads to the requirement that $\iota_{max} > 2\iota_{min}$. In the prototype implementation the $\iota_{min}$ was set at $\frac{1}{2}\iota_{des}$ and $\iota_{max}$ at $3\iota_{min}$ with satisfactory results.

When a vertex is placed in the contour it is also assigned a velocity $v_i$ and acceleration $a_i$ which are obtained by averaging the velocities and accelerations of the two vertices which are replaced (FIG. 8a) or between which it inserted (FIG. 8b), which is necessary to maintain continuity in the dynamic situation.

A prototype implementation of the described method was applied to clinical images, in particular to a typical clinical intravascular ultrasound image. The image represented a cross-section through a blood vessel, scanned by a full $2\pi$ radians rotation of a transducer mounted on the tip of a catheter. Such an image comprises a number of more or less elliptical shapes, representing the layered structure of the vessel wall. Some of these elliptical shapes show up as bright ridges, while others show up as dark valleys. The area inside the vessel was partly blocked. The remaining open area was visible as a dark region. Both bright ridges and dark valleys are interesting from a clinical point of view, as well as the edge of the open area.

There are a number of reasons why it would be very difficult, if not impossible, to extract the desired contours from an image like this, using conventional (local) edge extraction methods. As usual in ultrasound images, the signal to noise ratio is very low and large pans of the image are obscured by shadows. An additional difficulty is caused by the presence of the catheter (in the lower pan of the open area, touching the vessel wall) and overlaid artificial tickmarks for distance measurement. The invented method succeeded well in defining the contours which describe the light and dark elliptical shapes in the vessel wall as well as the edge of the open area inside the vessel.

For the bright ridges the inverse pixel grayvalue was used as the image feature energy distribution, in order to allow the method to direct the contour to follow valleys. For the dark valleys the pixel grayvalues themselves can be used.

In the contour to be defined along the edge of the open area inside the vessel, it was chosen to position the desired path of this contour between dark and bright image regions, so to make it to follow a path of maximum grayvalue gradient. As the contour in the used implementation of the method will follow valleys through the external image feature distribution, the reciprocal length of the grayvalue gradient is suitable as the image feature energy distribution. In such distribution, parts of the edge of the open area show up as valleys which do however not form a closed shape. The contour found by the method and the original image appeared to be an accurate definition of the edge of the open area.

It appears that the operator-defined initial contour may have a very low resolution without jeopardizing the contour finding process. The initial resolution is automatically and quickly increased by the resampling mechanism, which is integrated in the deformation process, until it is on the level that was specified v,a the parameter $\iota_{des}$. This will be realized after only a few deformation steps, and from there on the resampling process will keep the resolution at the required level. Consequently, the amount of user interaction in defining an initial contour can be very small. The amount of interaction may be reduced even further, by making use of the possibility to create an open contour as an initial contour, and letting it grow by finding its own path.

In case several contours have to be defined in more or less similar images, operator intervention can be reduced by using the resulting contour of an image as the start contour for a next image. This occurs, for example, in MRI or CT images in which a volume of a patient is scanned and the results are presented as a plurality of two-dimensional images, each image representing a slice from the volume.

Figure 9:
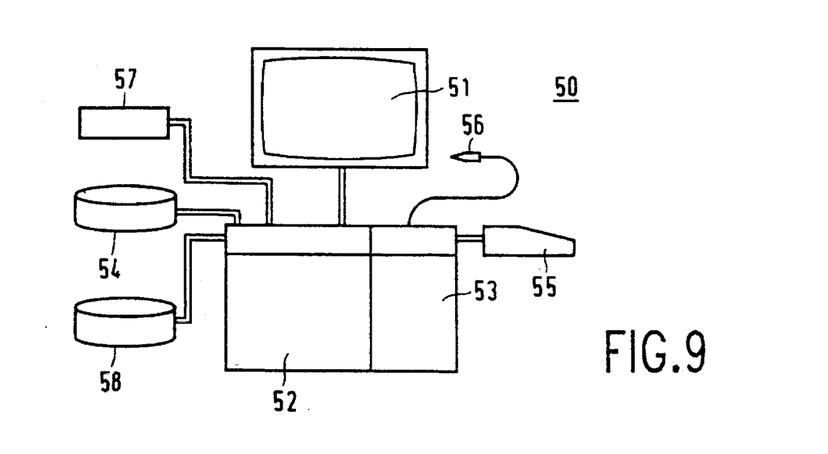
FIG. 9 diagrammatically a workstation for performing the invented method.

In FIG. 9 a workstation 50 is sketched in which the present invention can be applied. The workstation 50 comprises a display screen 51 for displaying images, a memory 52 and computing means 53. The workstation further comprises an input device 54 for input of data that represent an image in which contours are to be determined. Such an input device is, for example a magnetic or optical disc reader or a magnetic tape reader. It may also be a link to a central data storage or to a device that generates image data, for example an ultrasound device, a CT-scanner or an MRI-apparatus. The workstation, even can form an integral pan of such device and allow the operator to determine contours in generated images and use the results obtained to determine which further image data should be taken. An operator console 55, for example a keyboard, is provided for the user to give commands to the workstation. A pointing device 56, for example a lightpen, a trackball or a "mouse" for pointing at specific locations to define a start contour may be present as well. Additional devices may be connected to the workstation, such as a unit 57 to provide a hard copy of the image visible on the display or a storage unit 58 for storing images and contour data obtained for later recall.

In the workstation data are read from the input device 54 and are stored in memory 52. The data represent a parameter with a variation in a space in which contours are to be determined. The parameter data are normally given as a number of values, each value giving the parameter value as determined in a small element (pixel or voxel) of the space investigated.

I claim:

1. Method for determining a contour in a space of image parameter values, comprising the following steps implemented on a computer:

accessing a memory storing image parameter values in a space in the form of a matrix of pixel values;

defining a plurality of initial vertices being located on a seed contour in said space, said vertices being connected by edges to neighbouring vertices;

evaluating an energy function comprising an internal portion which is a function of a curvature at each of the vertices and an external portion determined by the variation of the image parameter values at the location of each of said vertices;

determining a final contour by continuously varying the position of the vertices till the energy function reaches a minimum, characterised in that, for each of the vertices the internal portion of the energy function is dependent on the angle between the edges at the respective vertex and in that the external portion of the energy function is determined by the variation of the image parameter values in a single direction that bisects the angle between the edges at the respective vertex.

2. Method according to claim 1, characterised in that the internal energy portion is derived from the difference in angles of the edges at a series of adjacent vertices.

3. Method according to claim 2, characterised in that said internal energy portion is obtained by convolving said difference in angles with a symmetric discrete filter having a zero frequency component equal to zero.

4. Method according to claim 1, characterised in that the seed contour is open.

5. Method according to claim 1, characterised in that if during minimization of the energy function an edge length exceeds a first predetermined threshold, the edge is replaced by an additional vertex and connecting edges.

6. Method according to claim 1, characterised in that if during minimization of the energy function an edge length falls below a second predetermined threshold, the edge and the connected vertices are replaced by a single vertex.

7. Method according to claim 1, characterised in that a user defined energy distribution is added to the external portion of the energy function.

8. Method according to claim 1, characterised in that firstly a contour is determined in a first space and that, secondly, a contour is determined in a second space having a variation in image parameter values having similar features to the variation of the image parameter values in the first space whereby the seed contour in the second space is defined by transfer of the final contour obtained in the first space.

9. Arrangement for determining a contour in a space of image parameter values, the arrangement comprising a memory for storing image parameter values in said space in the form of a matrix of pixel values;

a display for displaying a two-dimensional image determined from said pixel values;

a pointing device for indicating initial vertex positions in the displayed image for defining a seed contour;

a computer, having access to said memory and said vertex positions, for evaluating an energy function comprising an internal portion which is a function of a curvature at each of the vertices and an external portion determined by a variation of image parameter values at the location of each of said vertices;

the computer being arranged for determining a final contour by continuously varying the position of the vertices till the energy function reaches a minimum, while for each of the vertices the internal portion of the energy function is dependent on the angle between the edges at the respective vertex and in that the external portion of the energy function is determined by the variation of image parameter values in a single direction that bisects the angle between the edges at the respective vertex.

10. Method according to claim 2, characterized in that the seed contour is open.

11. Method according to claim 3, characterized in that the seed contour is open.

12. Method according to claim 2, characterized in that if during minimization of the energy function an edge length exceeds a first predetermined threshold, the edge is replaced by an additional vertex and connecting edges.

13. Method according to claim 3, characterized in that if during minimization of the energy function an edge length exceeds a first predetermined threshold, the edge is replaced by an additional vertex and connecting edges.

14. Method according to claim 4, characterized in that if during minimization of the energy function an edge length exceeds a first predetermined threshold, the edge is replaced by an additional vertex and connecting edges.

15. Method according to claim 11, characterized in that if during minimization of the energy function an edge length exceeds a first predetermined threshold, the edge is replaced by an additional vertex and connecting edges.

16. Method according to claim 2, characterized in that a user defined energy distribution is added to the external portion of the energy function.

17. Method according to claim 3, characterized in that a user defined energy distribution is added to the external portion of the energy function.

18. Method according to claim 15, characterized in that a user defined energy distribution is added to the external portion of the energy function.

19. The method of claim 1 wherein said image parameter values are obtained from a medical imaging modality.

20. The arrangement of claim 9 wherein said image parameter values are obtained from a medical imaging modality.

* * * * *